United States Patent
Fischer (10) Patent No.: US 6,622,378 B1
(45) Date of Patent: Sep. 23, 2003

(54) HANDLING MODULE FOR AT LEAST ONE COMPONENT FOR MOUNTING ON AND REMOVAL FROM A COMPONENT CARRIER

(76) Inventor: Helmut Fischer, Bergwaldstrasse 28, D-75391 Gechingen (DE)

( * ) Notice: Subject to any disclaimer, the term of this patent is extended or adjusted under 35 U.S.C. 154(b) by 0 days.

(21) Appl. No.: 09/502,374

(22) Filed: Feb. 11, 2000

(30) Foreign Application Priority Data

Feb. 12, 1999 (DE) .......................................... 199 05 940

(51) Int. Cl.[7] .................................................. B23P 19/00
(52) U.S. Cl. .......................... 29/739; 29/593; 29/744; 29/832; 156/325; 156/333
(58) Field of Search .......................... 29/739, 744, 593, 29/832; 156/325, 333

(56) References Cited

U.S. PATENT DOCUMENTS

| 3,574,919 A | * | 4/1971 | Reppert .................... 29/429 |
| 3,765,075 A | * | 10/1973 | Olney et al. .............. 29/203 B |
| 3,868,759 A | * | 3/1975 | Hartleroad et al. ........... 29/464 |
| 4,100,826 A | * | 7/1978 | Takahashi ..................... 82/25 |
| 4,387,508 A | * | 6/1983 | Wyatt ........................ 29/738 |
| 4,408,753 A | * | 10/1983 | Chapman et al. .............. 269/8 |
| 4,449,027 A |   | 5/1984 | Fujikawa |
| 4,742,612 A | * | 5/1988 | Dokan et al. ................. 29/739 |
| 4,890,382 A | * | 1/1990 | Anderson et al. ............. 29/833 |
| 4,969,252 A | * | 11/1990 | DiGregorio .................. 29/603 |
| 4,998,859 A | * | 3/1991 | Oshima et al. ............. 414/680 |
| RE33,780 E | * | 12/1991 | Itagaki et al. ................ 29/741 |
| 5,181,312 A | * | 1/1993 | Gross ........................ 29/611 |
| 5,288,119 A | * | 2/1994 | Crawford et al. ........... 294/65.5 |
| 5,618,396 A | * | 4/1997 | Hiermaier et al. ........... 204/297 |
| 5,726,508 A | * | 3/1998 | Neff et al. .................... 310/12 |
| 5,814,180 A | * | 9/1998 | King ........................ 156/333 |
| 5,842,272 A | * | 12/1998 | Nuxoll ....................... 29/739 |
| 5,850,685 A | * | 12/1998 | Wright et al. ................. 29/751 |
| 5,860,208 A | * | 1/1999 | Nomura ...................... 29/740 |
| 5,876,556 A | * | 3/1999 | Takanami .................. 156/556 |
| 6,049,043 A | * | 4/2000 | Tonejc ....................... 174/250 |
| 6,134,998 A | * | 10/2000 | Loeffler et al. ............... 82/162 |
| 6,298,547 B1 | * | 10/2001 | Okuda et al. ................. 29/740 |

FOREIGN PATENT DOCUMENTS

| GB | 2 172 526 A | 2/1986 | .......... H05K/13/02 |
| JP | 03073288 | 3/1991 | ............ B25J/15/06 |
| JP | 10226423 | 8/1998 | ........... B65G/59/04 |
| RU | 975394 | 2/1981 | |

OTHER PUBLICATIONS

French Search Report dated Oct. 24, 2000.
British Search Report dated Aug. 3, 2000.

* cited by examiner

*Primary Examiner*—A. Dexter Tugbang
*Assistant Examiner*—Paul Kim (57) ABSTRACT

The invention relates to a handling module for at least one component (12) for mounting on and removal from a component carrier (14), having a holding device (22) which has at least one receptacle which is matched to the component (12), having a coil (42) which is arranged at an end of the holding device (22) which faces towards the component (22), is energized when the holding device (22) is being at least partially positioned with respect to the at least one component (12) and positions the at least one component (12) with respect to the holding device (22) by means of magnetic holding force.

35 Claims, 5 Drawing Sheets

HANDLING MODULE FOR AT LEAST ONE COMPONENT FOR MOUNTING ON AND REMOVAL FROM A COMPONENT CARRIER

The invention relates to a handling module for at least one component for mounting on and removal from a component carrier.

DE 44 19 982 C2 has disclosed a component carrier which fixes components by means of a magnetic holding force. This device is used for surface treatment or coating of components, such as for example magnetic armatures and connection pieces for fuel-injection valves. These are very small and lightweight components which are machined to size with a high dimensional accuracy and the surface of which is extremely sensitive. Therefore, at one end the components are held to the component carrier by means of a magnetic holding force, and the carrier is immersed in coating baths or the like.

To remove the components from the component carrier, specifically designed gripping grooves or an encircling collar is provided at a distance from a coated surface, so that the components can be pulled off by means of a device. For this purpose, it is necessary for the maximum magnetic holding force which results on the component to be overcome. This removal operation from the holding device has the drawback that, owing to the low capacity of this component carrier, the removal device is also only able to take a small number of components and a long time is required for manual removal. Components of this nature are coated in three-shift operation, and the number of components required is more than 200,000 per day.

A further drawback is that these components are of relatively complex design, having a groove or a collar on the circumferential surface of the component, so that these components can be pulled off the holding device. This results in high manufacturing costs for the component. Furthermore, removal from the component carrier cannot be incorporated into an automated process. It is also impossible to monitor or check for faulty components.

Therefore, the invention is based on the object of providing a handling module which allows simple and inexpensive handling of the components, incorporation into an automated process and allows the components to be checked or monitored.

According to the invention, this object is achieved by means of the features of claim 1.

The handling module according to the invention has the advantage that the components which are to be handled are at least simple to remove from the component carrier without having to construct elements for pulling them off. By designing a holding device for the component which is to be removed which has a holding magnet, handling can take place without damaging a coated surface or a high-precision surface of the component. Furthermore, the handling module according to the invention has the advantage that computer-assisted control allows the removal operation to be incorporated in manufacture by means of an automated process. Furthermore, the handling module can be used to remove components from a component carrier with a high packing density, so that short cycle times are achieved, which are of essential importance for a mass-produced product. By way of example, the armatures for fuel-injection nozzles, which are produced to a very high level of precision and are partially surface-coated, can be mounted and removed by the handling module according to the invention.

Further advantageous configurations of the invention are given in claims 2 to 17.

According to one advantageous configuration, the holding device has a substantially cylindrical body which in a bottom section has a receiving section for a component and a magnetic holding system and in a top section has a connection plate for the magnetic holding system and a contact pin. The cylindrical arrangement of the holding device allows the holding device to occupy a small volume, enabling a high packing density to be achieved for the handling module. Furthermore, separating the mechanical and electrical components into a top and a bottom level has the advantage that there are no cables or the like, which may cause faults, in the bottom level, which faces towards the component.

According to a further advantageous configuration of the invention, the holding device is provided on a holding plate which preferably has holes which are mounted so that they yield resiliently. This makes it possible to provide a simple configuration of the holding plate for receiving a plurality of holding devices. Furthermore, the resiliently yielding arrangement of the holding device has the advantage that the holding device, while it is being positioned with respect to the component, can deviate into a removal position in the event of any fault arising, so that it is possible to avoid damage to the component and the holding device and to the receptacle for the holding device.

Advantageously, the holding device is adhesively bonded to the holding plate, so that simple joining and rapid fitting can be achieved. Particularly in the case of very small holding devices, as is the case in accordance with the exemplary embodiment, it is possible to provide simple and rapid fixing. The bonding agent is preferably designed as a conductive adhesive.

According to a further advantageous configuration of the invention, in order to remove cylindrical components with a hole, a receiving section is provided on the holding device, which receiving section is preferably designed as a mandrel which penetrates at least partway into the hole in the component. As a result, due to the penetration of the mandrel into the hole, the component can be positioned with respect to the holding device and can be fixed by the magnetic holding system without providing structural measures on the component itself. Advantageously, the mandrel has guide-in slopes at its free end, so that it can penetrate easily into the hole. The mandrel advantageously has a magnetic ring which is positioned inside the hole in the component in a holding position with respect to the holding device. As a result, after a coil of the holding device has been energized, it is possible, by reducing the air gaps, to create a high magnetic flux with respect to the component which is preferably made from ferromagnetic material, with the result that a high holding force can act on the component.

According to a further advantageous configuration of the invention, a testing and monitoring device is provided above the holding plate for receiving the holding device. In this way, the holding device can be monitored while the component is being gripped or while it is penetrating into the cylindrical hole in the component. In the event of a fault, the holding device can deviate out of a zero position with respect to the holding plate, in which case the contact pin of the holding device preferably comes into contact with the test and monitoring device on the top section, with the result that a signal which is characteristic of the fault is emitted. Advantageously, the test and monitoring device is provided as a printed-circuit board with conductor track, in order for the signals to be transmitted via a plug connector to a process-monitoring unit. The printed-circuit board, which represents part of the test and monitoring device, advantageously has a tongue which yields resiliently and can be actuated by a contact pin of the holding device in the event of the latter deviating out of the zero position. In this way, the test and monitoring device can be used to determine the position at which a fault has occurred.

The handling module advantageously has a plurality of holding devices on one holding plate, which are arranged in rows and columns, so that a multiplicity of components can be mounted and removed in a single operation.

Furthermore, the object according to the invention is achieved by means of a method in accordance with claim 18. By positioning the holding device with respect to the component carrier in a gripping position and then energizing the holding device, it is possible for highly sensitive components to be mounted in and removed from a component carrier without damage to the surface or a coated surface. Furthermore, the components can then simply be deposited in a further component carrier, by de-energizing the holding device. This method can be process-automated.

A particularly advantageous application is the removal of components from a component carrier following surface coating by electrodiposition, in order to transfer the components from the component carrier to a further component carrier for further processing or packaging. At the same time, the dimensional accuracy of the components can be checked.

Advantageous embodiments of the method are given in the further claims 19 to 27.

A particularly preferred exemplary embodiment of the invention is described in more detail below in the description with reference to the drawings, in which.

Figure 1:
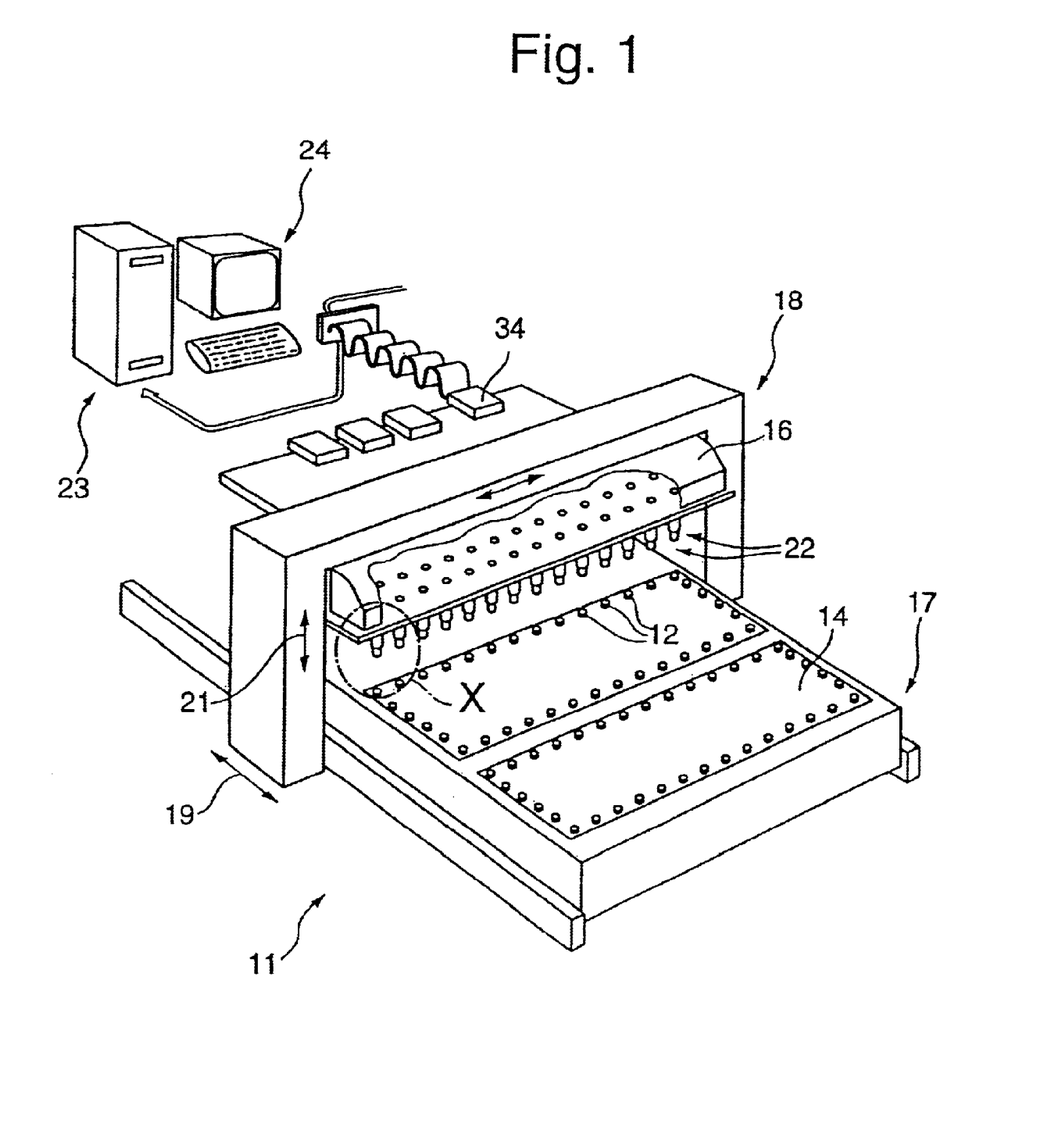
FIG. 1 diagrammatically depicts a process-automated unit with a handling module for checking and removing components from a component carrier.

FIG. 1 shows a perspective illustration of a processing station 11 for removing components 12 from a carrier. The present application example is designed to remove the components following, for example, an electrodeposition process carried out on armatures which are used in fuel-injection pumps in internal-combustion engines. These components 12 are highly sensitive to mechanical damage and are produced by high-precision machining. Their end face 13 (FIG. 4) is surface-coated, in particular hard chromium plated, in order for it to be able to withstand the loads imposed during use. For a coating operation, components 12 are mounted on a component carrier 14. Then, the component carrier 14 is fed to the electrodeposition baths. After the end of the coating operation, the component carrier 14 is positioned with respect to a handling module 16, in order for the components 12 to be removed so that they can be made available for subsequent process steps. The component carrier 14 is fitted in a frame 17. The handling module 16 is provided on a gantry 18 which can be moved to and fro on the frame 17 in the direction of arrow 19. The handling module 16 can be moved up and down in the gantry 18 in the direction of arrow 21. As an alternative, it is possible for the handling module 16 to be in a fixed position and for a component carrier 14 to be movable in the direction of arrows 19 and 21, in a corresponding way to the handling module 16, for the removal operation. One or more component carriers processed one after the other by means of the handling module 16.

The number and arrangement of components 12 of the handling module 16 corresponds to the component carrier 14, in order for all the components 12 to be removed from the component carrier 14 at the same time. This removal of components is monitored by a process-control unit, and the individual data which are recorded are evaluated by means of data-processing unit 23 and are displayed by means of a screen 24. This monitoring and control can operate as a single station or may be incorporated in a automated process.

The handling module 16 and the holding device 22 are described in detail below.

Figure 2:
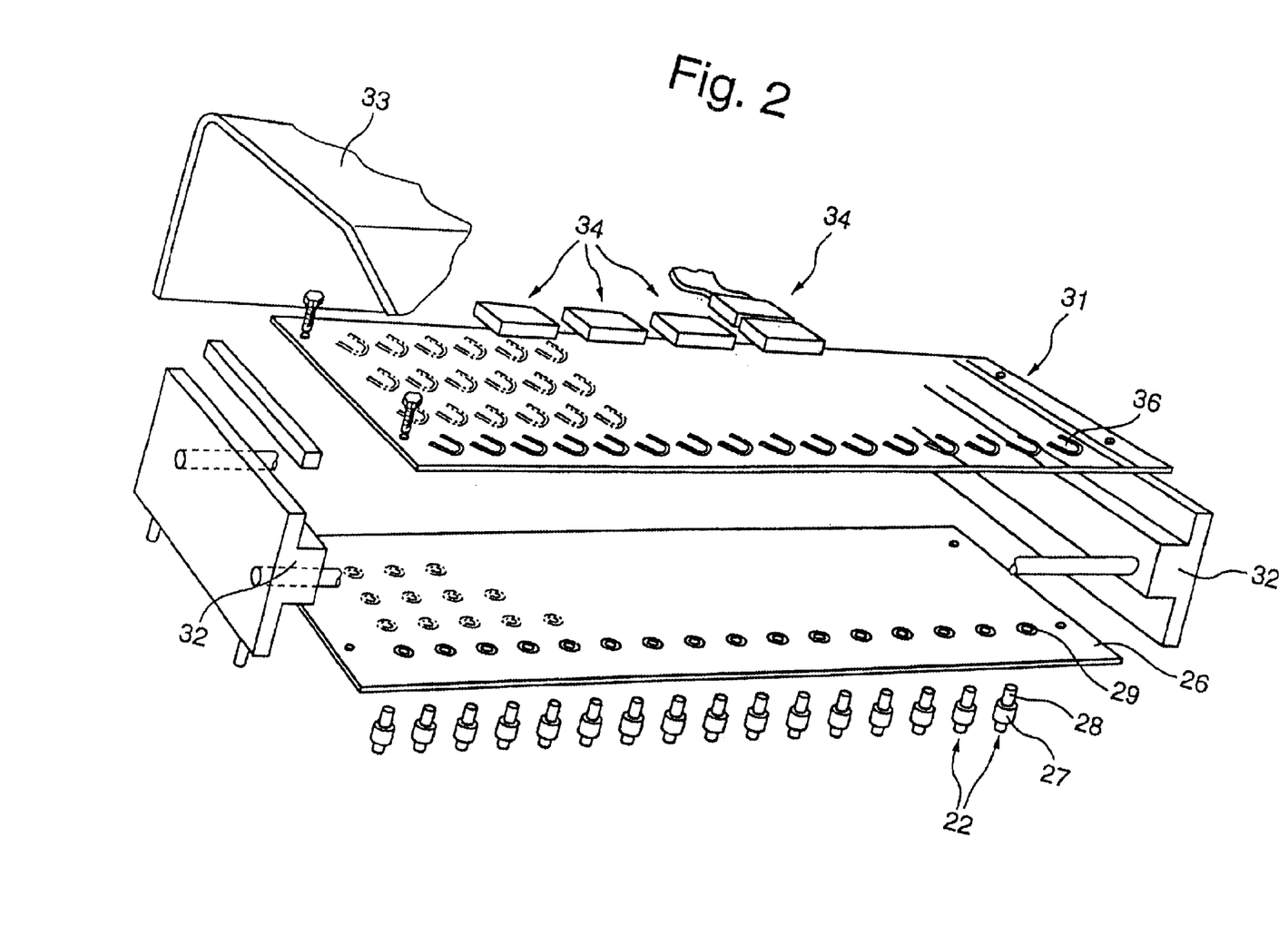
FIG. 2 shows a perspective view of a handling module.

The handling module 16 has a holding plate 26 for receiving the individual holding devices 22. The holding devices 22 are arranged in rows and columns at regular distances from one another, the number of rows and columns preferably being determined by a binary code. The holding device 22 has a bottom section 27 and a top section 28, the bottom section 27 being arranged below the holding plate 26. The top section 28 penetrates through a hole 29 in the holding plate 26. The top section 28 of the holding device 22 is provided between the holding plate 26 and a printed-circuit board 31 which is arranged above it and represents part of the test and monitoring unit. The holding plate 26 and printed-circuit board 31 are arranged at a predetermined distance from one another by means of side walls 32. This distance can be adjusted as a function of the configuration of the holding device 22. The holding plate 26, the printed-circuit board 31 and the side walls 33 form a housing for the handling module 16, which may preferably be closed by means of a cover 33. Receptacles for attaching the handling module 16 to the gantry 18 are provided on the side walls 32.

The printed-circuit boards 31 have plug connections 34, by means of which the information determined by the printed-circuit board 31 can be transmitted to the data-processing unit 23. The printed-circuit board 31 has conductor tracks which run from the plug connections 34 to tongues 36 which yield resiliently, and in the event of a fault these tracks interact with the holding device 22. These tongues 36 are arranged congruently with respect to the holes 29 in the holding plate 26. The number of plug connections 34 may correspond to the number of rows on the printed-circuit board 31. Equally, it is possible for them to be divided into fields, so that the rows and columns for receiving the holding devices 22 are divided in sections into a plurality of fields which are monitored individually.

Figure 3:
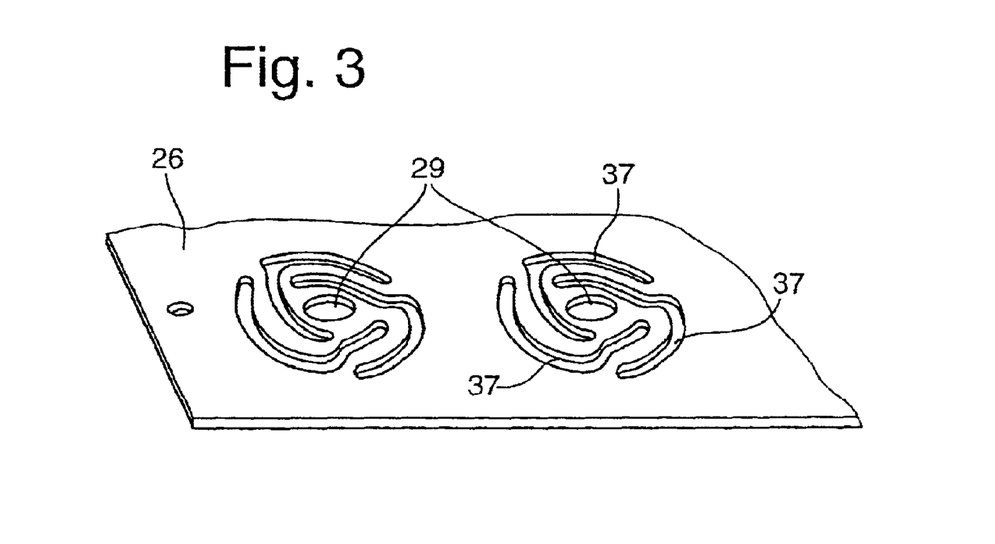
FIG. 3 shows a detailed illustration of a receiving hole in a holding plate of a holding device.

The holes 29 in the holding plate 26 are arranged so as to yield resiliently with respect to the holding plate 26, as shown in FIG. 3. The arrangement and configuration of apertures 37 next to the hole 29 allows the latter to deviate out of a plane of the holding plate 26 as a function of the particular load. The apertures 37 are advantageously produced by etching or laser cutting or water-jet cutting or the like.

Figure 4:
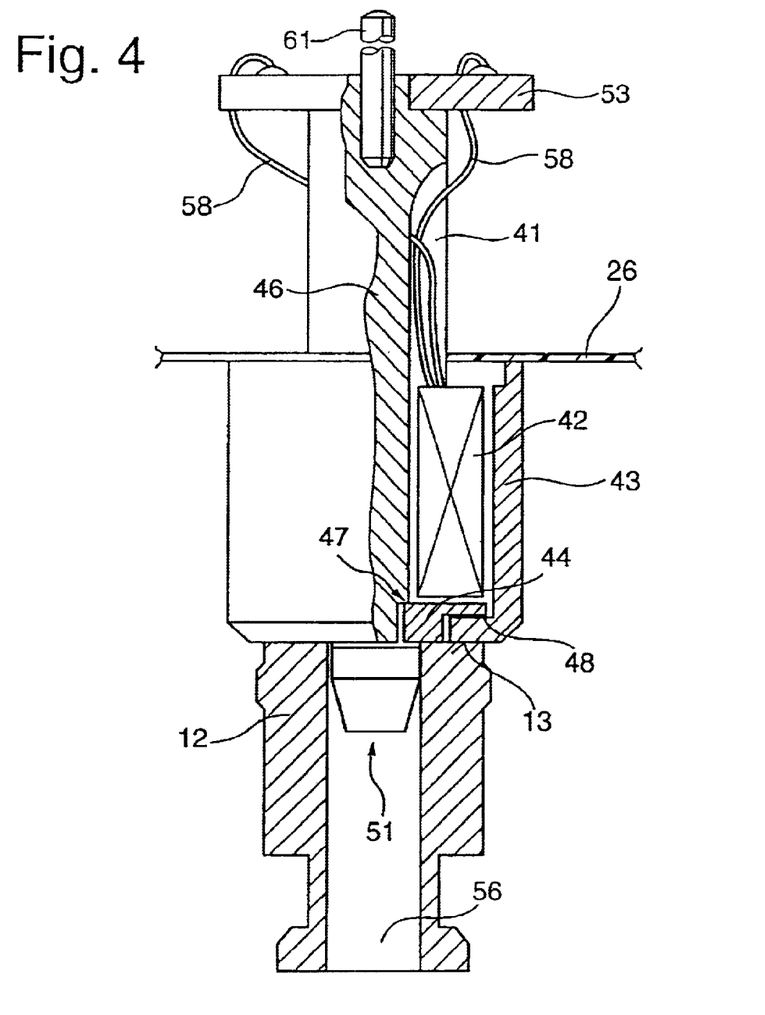
FIG. 4 shows a diagrammatic, detailed illustration of a holding device with a component fixed to it.
Figure 5:
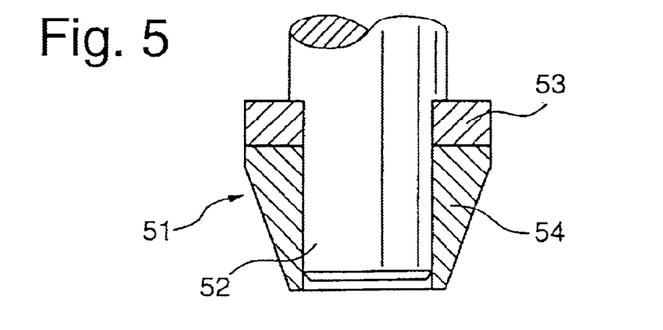
FIG. 5 shows a diagrammatic, detailed illustration of a mandrel of the holding device.

FIG. 4 illustrates a diagrammatic, partial cross section through the holding device 22 with a component 12 arranged in a holding position. The holding device 22 has a base body 41 which extends through the hole 29 in both the bottom and top sections 27, 28. The holding device 22 is preferably attached to the holding plate 26 by a bonding agent which is applied in the area of the hole 29, in order to hold the base body 41. In this case, a conductive adhesive is advantageously provided. In the bottom section 27 of the holding device 22, a coil 42, which is surrounded by a housing shell 43, is arranged coaxially with respect to the base body 41. At a bottom end side, there is a annular disc 44 which, when seen with regard to the centre axis 46, bears against a shoulder 47 of the base body, in order to receive the coil 42. Facing radially outwards on the annular disc 44, there is an encircling web 48 which engages behind the housing shell 43. This arrangement makes it easy to fit and mount the base body 41 with the coil 42. A mandrel 51 is provided so that it protrudes from the housing shell 43 and, on a narrowed section 52 of the base body 41, has a magnetic disc 53 and a non-magnetic, cylindrical body 54 which tapers conically downwards. The disc 53 and the cylindrical body 54 may be pressed on or may be arranged exchangably on the base body 41. Furthermore, it is possible for the mandrel 51 to have a surface coating. This may also be provided on a receiving section of the bottom section 27 which faces towards the component 12.

The mandrel 51 of the holding device 22 is designed in such a manner that it can penetrate into a passage hole 56 in the component 12. The dimension of the mandrel 51 in particular with respect to the external diameter of the disc 53 has a certain tolerance which is provided as a function of the passage hole 56. The holding device 22 is adapted to remove the components 12, as illustrated in FIG. 4. In principle, it is also possible for the holding device 22 to be designed without a mandrel 51 in order to carry out removal of the components, but this variant may advantageously be employed for testing purposes, as explained in more detail below. The holding device 22 operates on the principle of a plunger electromagnet. By energizing the coil 42, the component 12, which is preferably of ferromagnetic form, is held with respect to the bottom section 27 of the holding device 22 by means magnetic force. The coil 42 and the energizing may be selected and adjusted according to the component weight and the force required to pull components off the component carrier 14.

In the top section 28, the base body 41 has a recess for receiving the cables 58 from the coil 42, which are soldered to a disc 59. This disc 59 is conductively connected to the holding plate 26. Furthermore, at the top end of the base body 51 there is a contact pin 61 which in the event of a fault bears against the tongue 36.

Figure 6:
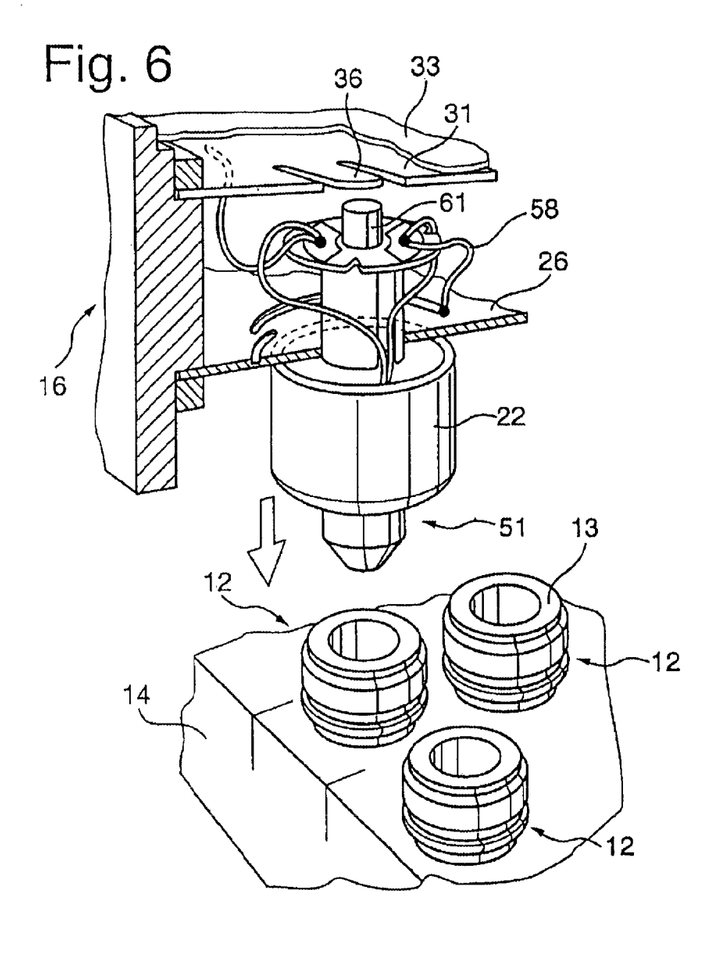
FIG. 6 shows a diagrammatic view of part of the handling module before a component is removed.
Figure 7:
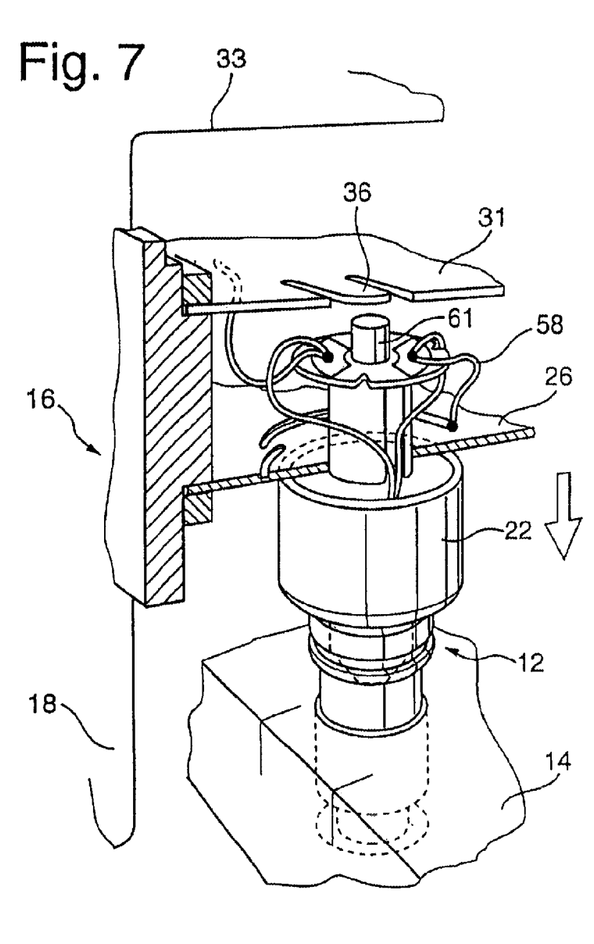
FIG. 7 shows a diagrammatic illustration of part of a handling module, in a gripping position with respect to the component.

An operation of removing a component is described in more detail below with reference to FIGS. 6 and 7:

The component carrier 14 is inserted in the frame 17. At the same time, a carriage which is arranged in the component carrier 14 can be moved relative to the components by means of magnetic force. For this purpose, magnets are provided on the frame 17 and interact with magnets on the carriage. As a result, the maximum resultant holding force is positioned outside a holding position of the respective component. The components 12 are arranged in an indifferent zone, meaning that the components are positioned between two holding magnets which are arranged on the carriage, with the result that the holding force is at least reduced. Consequently, the components 12 can be lifted off the component carrier 14 relatively easily without the full holding forces acting on the components 12 which are to be moved. The handling module 16 is positioned in a removal position with respect to the component carrier 14, which may preferably be made reproducible by means of indexing. Then, the handling module 16 is lowered in the direction of arrow 21, so that the holding devices 22 are moved onto the components 12. The mandrel 51 of the holding device 22 penetrates into the cylindrical hole 29 in the component 12. The downwards movement of the handling module 16 is, for example, kept on a predetermined path. This may be such that an underside, facing towards the end face 13 of the component 12, of the bottom section 27 is arranged so as to still have a small air gap with respect to the end face 13. It is also possible for the holding device 22 to be lowered towards the component 12 until it comes into contact with the end face 13. This position may also be recorded by means of sensors, contacts or the like on the holding plate 26, so that the lowering movement for the handing module 16 is then kept under control.

After the holding device 22 has been positioned with respect to the component 12, the coil 42 is energized, with the result that the component 12 is held to the bottom section 27 of the holding device 22 as a result of induction of the magnetic force. This is followed by an upwards movement of the handling module 16 in the direction of arrow 21, with the result that all the components 12 are removed from the component carrier 14 by means of a lifting movement. After the handling module 16 has reached an upper position, the gantry 18 is transferred into a second position, in order for the components 12 to be deposited in a further component carrier, so that, for example, it is possible to carry out a further check on the thickness of the surface layer or further processing operations or to prepare the components for packaging.

It will be understood that the component carrier 14 can also be moved up and down with respect to the handling module 16 and to and fro in the direction of arrow 19, in order for the mounting and removal operation to be carried out.

In order for the components 12 to be deposited in a further component carrier 14 or on a pallet or the like, the handling module 16 is in turn transferred into an appropriate position, so that the components 12 can be put down in a predetermined position. Then, the coil 42 is de-energized, with the result that the magnetic holding force of the holding device 22 is released, so that the components 12 can be fixed on a component carrier or a pallet, on which a magnetic force may also be acting, while they are being lifted off the holding device 22.

Figure 8:
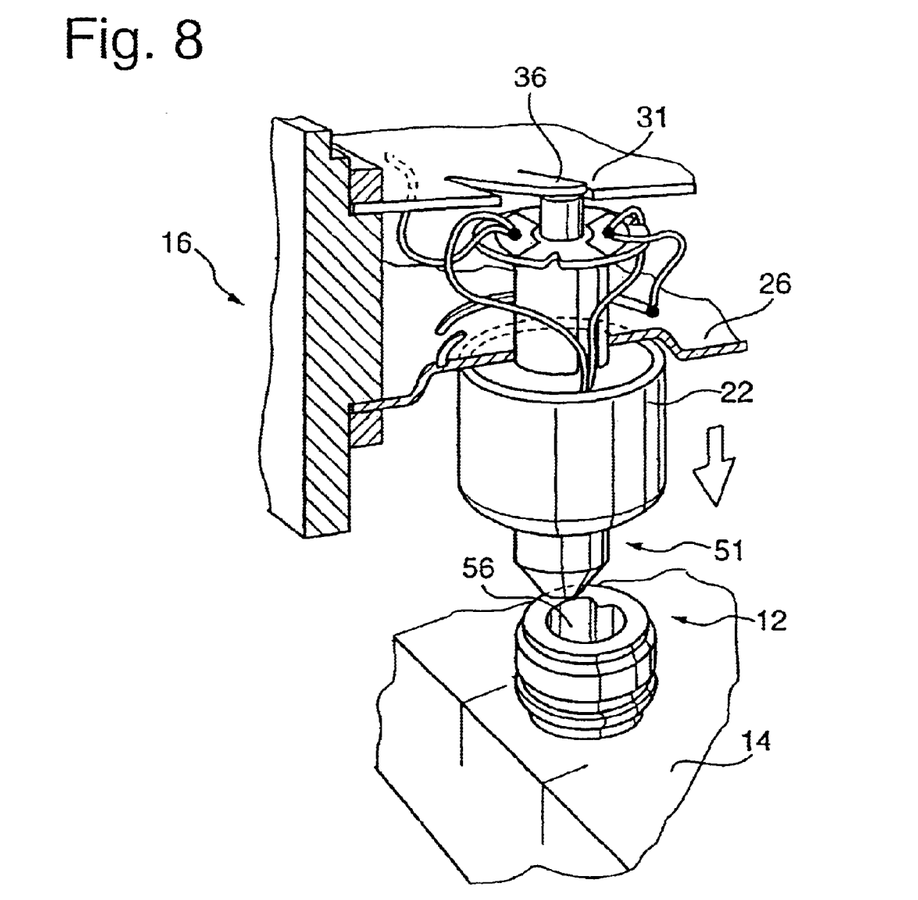
FIG. 8 shows a diagrammatic, detailed illustration of a fault while the holding device is being positioned with respect to the component.

At the same time as the removal operation, the integrated test and monitoring device determines whether there are faulty or damaged components 12 on the component carrier 14. If, for example in the event of inexact positioning of the component, as illustrated in FIG. 8, it becomes difficult or even impossible for the mandrel 51 to penetrate into the component hole 56, a relative movement takes place between the resilient hole 29 and the holding plate 26. The downwards movement of the holding device 22 is blocked by the component 12, whereas initially the handling module 16 is lowered further. After the handling module 16 has been lowered further by a specific fraction of its travel, the contact pin 61 comes into contact with the tongue 36 of the printed-circuit board 31 positioned above it. As a result, a signal is transmitted to the electrical control unit, which immediately switches over from a lowering movement to an upwards movement. At the same time, the electrical control unit can recognize the position at which the components 12 causing the fault is arranged in the component carrier 14. For this purpose, each tongue 36 is connected to a conductor track which leads to a plug connection 34, with the result that the fault can be directly traced to the component 12. For this purpose, the contact pin 12 is electrically conductive, so that in the event of it coming into contact with the tongue 36 a circuit is closed, in order for the signal to be triggered.

Furthermore, it is possible to check whether the hole 29 is faulty or has a burr. The external diameter of the cylindrical disc 52 may have a tolerance and be designed as a so-called test mandrel. If there is a faulty hole 29 or a burr, the downwards movement of the holding device 22 is blocked, with the result that the contact pin 61 again comes to bear against the resilient tongue 36 and triggers a signal.

After a fault has been detected and the handling module 16 has been returned to an initial position with respect to the component carrier 14, the component 12 causing the fault can be removed manually, the position being displayed on the screen 24. Alternatively, it is possible for optical indicator devices assigned to each holding device 22 to be provided on the handling module 16, which indicator devices indicate the position of the damaged component.

The handling module according to the invention makes it possible to mount and remove components, and this device can be used not only for small components which are highly sensitive and have undergone high-precision machining, as described in this particular application. These components weigh, for example, 1 g. The holding device 22 is therefore of correspondingly small and sensitive design. This also applies to the hole 29 which is arranged resiliently with respect to the holding plate and the resilient tongue 36 arranged above it. The distance between the contact pin 61 of the holding device 22 and the tongue 36 can be adjusted according to the particular applications. The maximum deviation of the hole 29 with respect to the holding plate 26 forms an upper limit for this distance. Furthermore, it is possible for the extent of deviation of the resilient tongue 36 to be recorded, thus allowing further estimation of the error which may have occurred. As an alternative, this deviation may also be used to determine when a holding device is bearing against a component which is to be removed.

It is also possible for the handling module according to the invention to be used to mount components on a component carrier. For example, the holding device 22 may be energized when the handling module 16 is arranged in an upper position, with the result that the components are positioned manually with respect to a holding device 22. This procedure may be advantageous if it is simpler and less time-consuming from a handling perspective for the components to be positioned with respect to the handling module than inserted into a component carrier. The design of the magnetically acting holding devices 22 and the small structural size make it possible to provide a holding device 22 for each component. As a result, it to possible, on the one hand, for a large number of components to be simultaneously chocked and, in addition, mounted and removed by means of one handling module. Furthermore, the design of the holding devices 22 according to the invention allows high packing density to be achieved, so that it is possible to achieve a low cycle time per component, which has proven advantageous in particular in the case of small, mass-produced parts.

Alternatively, it is possible for a holding device 22 to be designed for two or more components 12. For example, one magnetic holding system and a plurality of receiving sections or mandrels 51 may be provided on the bottom section 27, so that it is likewise possible to mount and remove the components with a high packing density thereof. At the same time, this provides an inexpensive design.

Furthermore, alternative movement arrangements and movement sequences may be provided for the handling module 16 and the component carrier 17, for example, it is possible for the handling module 16 and the component carrier 17 to be moved towards one another simultaneously or with a time interval, in order to allow the components to be mounted on and removed from: the component carrier 17. In this context, it in possible, for example, for the handling module 16 to be moved over a first distance as rapid adjustment and pre-positioning, and then for the component carrier 17 to carry out fine positioning. It is also possible for both the handling module 16 and the component carrier 17 to be set in motion simultaneously in order for the mounting and removal operations to be carried out. The selection of the times at which the movement of handling module 16 and component carrier 17 is to begin and of their acceleration and deceleration movements or pauses provided between the movement phases, depends on the particular applications. Furthermore, it is also possible to separate the movements, so that, for example, the handling module 16 only carries out the movement in the direction of arrow 21 and the component carrier 17 only carries out the movement in the direction of arrow 19, or vice versa. All possible alternatives for the movement of handing module 16 and component carrier 17 can be used, and within these movement alternatives it is also possible to vary and exchange the individual movement parameters, such as acceleration, deceleration and movement distance.

What is claimed is:

1. A handling module for mounting at least one component (12) on a component carrier (14) or for removal from a component carrier (14), having at least one holding device (22), which has at least one receptacle which is matched to the at least one component (12), and a magnetic holding system having a coil (42) which is arranged at one end of the at least one holding device and faces towards the at least one component (12), which is energized when the at least one holding device (22) is being at least partially positioned with respect to the at least one component (12) and positions the at least one component (12) with respect to the at least one holding device (22), by magnetic holding force, a holding plate (26) arranged on the holding device, and a test and monitoring device, above the holding plate (26) that interacts with the holding device in the event of deviation of the holding device.

2. The handling module according to claim 1, characterized in that the top section (28) of the at least one holding device (22) is provided with a connection plate (59) for connecting the magnetic holding system and a contact pin (61).

3. The handling module according to claim 1, characterized in that the at least one holding device (22) is arranged on the holding plate (26) which has a hole (29) for receiving the at least one holding device (22), and at least one aperture (37) being provided adjacent to the hole (29), which the at least one aperture arranges the hole (29) resiliently with respect to the holding plate (26).

4. The handling module according to claim 1, characterized in that the at least one holding device comprises a bottom section (27) of the at least one holding device (22) provided beneath the holding plate (26).

5. The handling module according to claim 1, characterized in that the at least one holding device (22) is attached to the holding plate (26) by a conductive bonding agent.

6. The handling module according to claim 1 characterized in that the at least one holding device (22) is provided with a mandrel (51) which has a cylindrical section with an external diameter which is slightly smaller than a diameter of a hole (59) in the component (12) to be removed, and the mandrel (51) is provided with a free end having guide slopes for penetrating into the component (12).

7. The handling module according to claim 6, characterized in that the mandrel (51) is arranged exchangeably on a section (52) of a base body (41) of the at least one holding device (22).

8. The handling module according to claim 6, characterized in that the mandrel (51) is provided with non-magnetic guide slopes and is provided with a magnetic cylindrical section (53).

9. The handling module according to claim 8, characterized in that the cylindrical section (53) is designed as a test mandrel.

10. The handling module according to claim 1, characterized in that the bottom section (27) has an annular disc (44) towards the base body (41), which annular disc (44) bears against a shoulder (47) of the base body (41) and the annular disc (44) engages on the outer circumference of the annular disc behind the housing shell (43).

11. The handling module according to claim 1, characterized in that the holding plate (26) has at least two rows and columns of holes (29) for receiving the at least one holding device (22).

12. The handling module according to claim 1, wherein the test and monitoring device is provided above the at least one holding device (22).

13. The handling module according to claim 1, characterized in that the test and monitoring device has at least one printed-circuit board (31) and plug connection (34).

14. The handling module according to claim 13, characterized in that the printed-circuit board (31) is arranged parallel to a holding plate (26) of the at least one holding device (22), the printed circuit board (31) having tongues (36) which yield resiliently congruently with respect to holes (29).

15. The handling module according to claim 14, characterized in that conductor tracks leading from each tongue (36) to the plug connection (34) are provided on the printed-circuit. board (31).

16. The handling module according to claim 15, wherein the conductor tracks of a first row of the tongues (36) are guided to a first plug connection (34) and are guided to, further plug connections.

17. The handling module according to claim 14, characterized in that the tongues (36) are actuated by a contact pin (61) of the at least one holding device (22) in the event of from an origin position.

18. The handling module according to claim 17, characterized in that an extent of deviation of the tongues (36) are recorded as a measurement signal by a data-processing unit (23).

19. The handling module according to claim 19, characterized in that an extent of deviation of the at least one holding device (22) is adjusted as a function of distance of the contact pin (61) from the tongues (36) of the printed-circuit board (31).

20. A handling module for mounting at least one component (12) on a component carrier or for removal from a component carrier (14), having at least one holding device (22), which has at least one receptacle which is matched to the at least one component (12), comprising a top section (28) and a bottom section (27) with a receiving section, and a magnetic holding system having a coil (42) which is arranged at the bottom section, (27) and faces towards the at least one component (12), which is energized when the at least one holding device (22) is being at least partially positioned with respect to the at least one component (12) and positions the at least one component (12) with respect to the at least one holding device (22), and a test and monitoring device, which is provided to the at least one holding device (22)

that interacts with the test and monitoring device, characterized in that the top section (28) of the at least one holding device (22) is provided with a connection plate (59) for connecting the magnetic holding system and a contact pin (61).

21. A handling module for mounting at least one component (12) on a component carrier or for removal from a component carrier (14), having at least one holding device (22), which has at least one receptacle which is matched to the at least one component (12), comprising a top section (28) and a bottom section (27) with a receiving section, and a magnetic holding system having a coil (42) which is arranged at the bottom section, (27) and faces towards the at least one component (12), which is energized when the at least one holding device (22) is being at least partially positioned with respect to the at least one component (12) and positions the at least one component (12) with respect to the at least one holding device (22), and a test and monitoring device, which is provided to the at least one holding device (22) that interacts with the test and monitoring device, characterized in that the at least one holding device (22) is arranged on a holding plate (26) which has a hole (29) for receiving the at least one holding device (22), and at least one aperture (37) being provided adjacent to the hole (29), which the at least one aperture arranges the hole (29) resiliently with respect to the holding plate (26).

22. A handling module for mounting at least one component (12) on a component carrier (14) or for removal from a component carrier (14), having at least one holding device (22), which has at least one receptacle which is matched to the at least one component (12), and a magnetic holding system having a coil (42) which is arranged at one end of the at least one holding device and faces towards the at least one component (12), which is energized when the at least one holding device (22) is being at least partially positioned with respect to the at least one component (12) and positions the at least one component (12) with respect to the at least one holding device (22), by magnetic holding force, a holding plate arranged on the holding device, and a test and monitoring device above the holding plate (26) that interacts with the holding device in the event of deviation of the holding device, characterized in that the at least one holding device comprises a bottom section (27) of the at least one holding device (22) is provided beneath a holding plate (26).

23. A handling module for mounting at least one component (12) on a component carrier (14) or for removal from a component carrier (14), having at least one holding device (22), which has at least one receptacle which is matched to the at least one component (12), and a magnetic holding system having a coil (42) which is arranged at one end of the at least one holding device and faces towards the at least one component (12), which is energized when the at least one holding device (22) is being at least partially positioned with respect to the at least one component (12) and positions the at least one component (12) with respect to the at least one holding device (22), by magnetic holding force, a holding plate arranged on the holding device, and a test and monitoring device above the holding plate (26) that interacts with the holding device in the event of deviation of the holding device, characterized in that the at least one holding device (22) is attached to the holding plate (26) by a conductive bonding agent.

24. A handling module for mounting at least one component (12) on a component carrier (14) or for removal from a component carrier (14), having at least one holding device (22), which has at least one receptacle which is matched to the at least one component (12), and a magnetic holding system having a coil (42) which is arranged at on end of the at least one holding device and faces towards the at least one component (12), which is energized when the at least one holding device (22) is being at least partially positioned with respect to the at least one component (12) and positions the at least one component (12) with respect to the at least one holding device (22), by magnetic holding force, a holding plate arranged on the holding device, and a test and monitoring device above the holding plate (26) that interacts with the holding device in the event of deviation of the holding device, characterized in that the at least one holding device (22) is provided with a mandrel (51) which has a cylindrical section with an external diameter which is slightly smaller than a diameter of a hole (59) in the component (12) to be removed, and the mandrel (51) is provided with a free end having guide slopes for penetrating into the component (12).

25. The handling module according to claim 24, characterized in that the mandrel (51) is arranged exchangeably on a section (52) of a base body (41) of the at least one holding device (22).

26. The handling module according to claim 24, characterized in that the mandrel (51) is provided with non-magnetic guide slopes and is provided with a magnetic cylindrical section (53).

27. The handling module according to claim 24, wherein the test and monitoring device is provided above the at least one holding device (22).

28. The handling module according to claim 24, characterized in that the test and monitoring device has at least one printed-circuit board (31) and plug connection (34).

29. The handling module according to claim 24, characterized in that the printed-circuit board (31) is arranged parallel to the holding plate (26) of the at least one holding device (22), the printed-circuit board (31) having tongues (36) which yield resiliently congruently with respect to holes (29).

30. The handling module according to claim 24, characterized in that conductor tracks leading from each tongue (36) to a plug connection (34) are provided on a printed-circuit board (31).

31. The handling module according to claim 24, wherein conductor tracks of a first row of tongues (36) are guided to a first plug connection (34) and the conductor tracks or further rows are guided to further plug connections.

32. The handling module according to claim 24, characterized in that tongues (36) are actuated by a contact pin (61) of the at least one holding device (22) in the event of movement from an origin position.

33. The handling module according to claim 32, characterized in that an extent of deviation of the tongues (36) arm recorded as a measurement signal by a data-processing unit (23).

34. The handling module according to claim 33, characterized in that an extent of deviation of the at least one holding device (22) is adjusted as a function of a distance of the contact pin (61) from the tongues (36) of the printed-circuit board (31).

35. A handling module for mounting at least one component (12) on a component carrier (14) or for removal from a component carrier (14), having at least one holding device (22), which has at least one receptacle which is matched to the at least one component (12), and a magnetic holding system having a coil (42) which is arranged at one end of the at least one holding device and faces towards the at least one component (12), which is energized when the at least one holding device (22) is being at least partially positioned with respect to the at least one component (12) and positions the at least one component (12) with respect to the at least one holding device (22), by magnetic holding force, a holding plate arranged on the holding device, and a test and monitoring device above the holding plate (26) that interacts with the holding device in the event of deviation of the holding device, characterized in that the holding plate (26) has at least two rows and columns of holes (29) for receiving the at least one holding device (22).

* * * * *